June 19, 1934. H. HONNEF 1,963,912
WIND MOTOR
Original Filed April 15, 1931

Inventor.

Patented June 19, 1934

1,963,912

UNITED STATES PATENT OFFICE 1,963,912

WIND MOTOR

Hermann Honnef, Dinglingen, Germany

Application April 15, 1931, Serial No. 530,294.
Renewed May 19, 1934. In Germany March 19, 1930

2 Claims. (Cl. 170—75)

This invention relates to a wind motor of the kind provided with wind wheels carrying dynamo members for the direct generation of electric current without gears, and its object is to obtain a wind wheel arrangement which can be conveniently supported at a considerable altitude and automatically controlled for maintaining a substantially uniform generation of power under varying wind pressure.

With this object in view the invention consists broadly in mounting the wind wheels in a frame which, in addition to a movement about a vertical axis for holding the wheels to the wind, is capable of being automatically tilted in a vertical plane together with the wheels for throwing the latter more or less out of the wind under increasing wind pressure and at the same time bodily displaced against the wind for counteracting the horizontal stresses in the supporting elements due to the increase in wind pressure.

The frame may for this purpose be supported on a pivoted platform by means of arcuate bearing surfaces whereon the frame, on being tilted by the wind pressure, can roll forwards against the wind.

Figure 1:
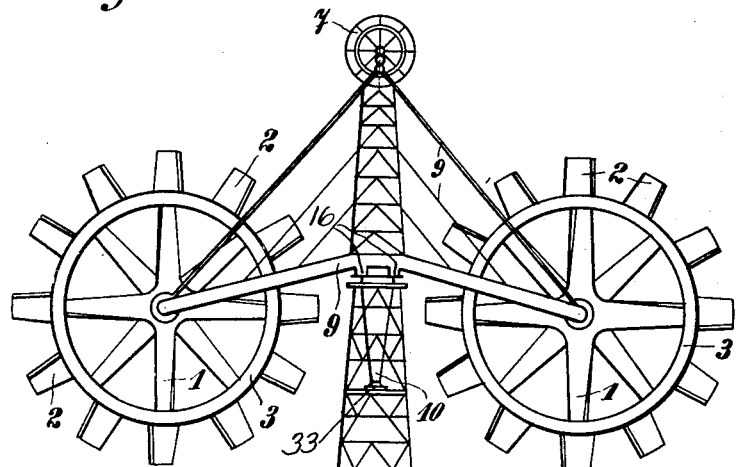
Figure 2:
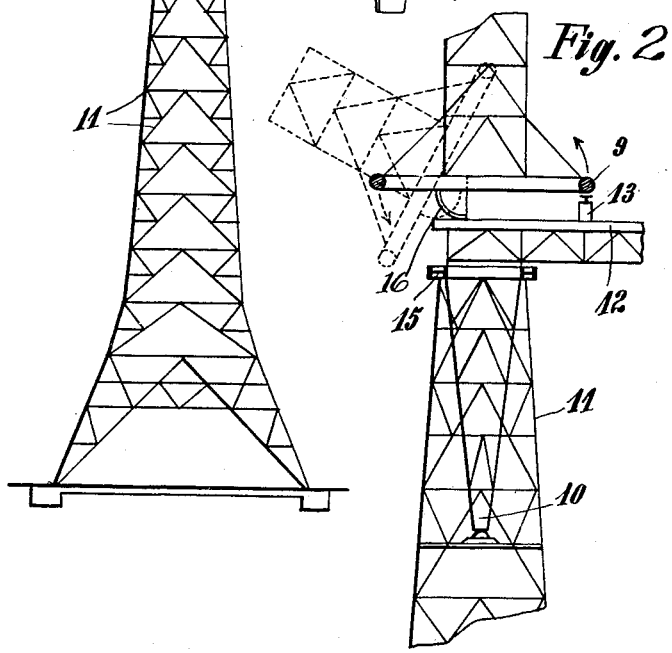

Fig. 1 of the accompanying drawing represents a front view of a wind motor according to the invention, and Fig. 2 is a side view of part of the wind motor.

The motor comprises a tower structure 11 of considerable height which carries, by means of a vertical pivot 10, a platform 12. The pivot 10 rests in a thrust bearing 33 surrounded by an oil or grease chamber and has a lateral support in the form of a ball or roller bearing 15. Supported on the platform 12 is a frame 9 which carries on outrigger arms two relatively balanced wind wheel structures. The frame is provided with two arcuate bearing surfaces 16 whereby it is supported on the platform 12, and there is also on the platform a support 13 whereon the frame normally bears, the centre of gravity of the frame and wheel structure being situated in a vertical plane between the supports 16 and 13. A rudder vane connected to the platform 12 is acted upon in known manner by the wind for turning the platform and frame structure about the pivot 10 so as to hold the wind wheels to the wind. The supporting elements 16 and 13 are aligned with the rudder vane, the elements 16 being in front. The wind wheels are held by the frame so that the centre of the wind pressure is situated below the supporting elements 16, and the wind will therefore have a tendency to tilt the frame structure about the supporting elements 16. At normal wind pressure the frame structure bears against all the supports. At increased pressure, however, the frame is caused by the wind to tilt forwards against the latter, as shown by dotted lines in Fig. 2, and the wheels, which participate in the movement, will then be thrown more or less out of the wind. Thus the speed of the wheels will be maintained substantially constant in spite of variations in the wind pressure. The frame structure, on tilting, rolls forward against the wind on the arcuate bearing surface 16, and this horizontal displacement of the centre of gravity will have the effect of relieving the tower of horizontal stresses due to the increase in wind pressure. This effect will be particularly noticeable on the bearing 15 which would otherwise be subjected to considerable one-sided wear.

Each wind wheel structure may comprise two co-axial wheels 1 and 2, one having the vanes inside and the other outside the wheel rim 3. The wheels rotate in opposite directions and carry complementary dynamo members in the rims 3. A small wind wheel 7 may be carried by the frame in an elevated position relative to the principal wheels for supplying the dynamo members with energizing current. This wheel will also be tilted together with the frame and thus thrown more or less out of the wind upon an increase in the wind pressure.

I claim:

1. A wind motor of the character described, comprising a tower, a platform supported on said tower and rotatable thereon in a horizontal plane, a frame having arcuate bearing surfaces and supported on the platform by means of said surfaces, and wind wheels carried by the frame so that the centre of wind pressure is below the bearing surfaces and tends to tilt the frame and roll it forwards against the wind on said bearing surfaces.

2. The structure claimed in claim 1 in combination with an additional support for the frame arranged on the platform behind the arcuate bearing surfaces, the centre of gravity of frame and wheel structure being situated in a vertical plane between the arcuate bearing surfaces and said additional support.

HERMANN HONNEF.